3,040,052
PREPARATION OF 2,2'-BIPYRIDYL
Anthony Howden Jubb, Norton-on-Tees, England, assignor to Imperial Chemical Industries Limited, London, England, a corporation of Great Britain
No Drawing. Filed Sept. 4, 1959, Ser. No. 838,054
Claims priority, application Great Britain Sept. 18, 1958
8 Claims. (Cl. 260—296)

This invention relates to the production of condensation products of pyridine.

It is known that two or more molecules of pyridine may be condensed together in such a way that each molecule of pyridine loses one atom of hydrogen. The product of this condensation reaction may contain 2:2'-dipyridyl. However, it may also contain considerable quantities of pyridine condensation products other than 2:2'-dipyridyl as well as degradation products of pyridine.

2:2'-dipyridyl is valuable as a chemical intermediate and it is a particular object of the present invention to provide a process by which 2:2'-dipyridyl is produced in high yield.

According to the present invention there is provided a process for the production of condensation products of pyridine which comprises heating pyridine at elevated temperature in the presence of a halide of zinc, cadmium or mercury.

The halide is preferably a chloride, very suitably zinc chloride.

It is preferred that the molar ratio pyridine to halide is within the range 1:2 to 25:1. A very suitable molar ratio is 2:1.

The pyridine and the halide may be introduced into the reactor in which the heating takes place in the form of a complex compound between the pyridine and the halide, for example, a complex compound in which two molecules of pyridine are linked with one molecule of the halide.

It is preferred that the elevated temperature is within the range 270° to 340° C.

The pressure may be suitably that developed autogenously at the temperature employed although higher pressures may be used.

The process may be operated batchwise or continuously.

The hot reaction mixture produced in the process of the invention corrodes many metals which are frequently used in the fabrication of reaction vessels for use in chemical processes. For example, stainless steel is seriously corroded. Not only does corrosion necessitate frequent and costly repair or replacement of metal reaction vessels but the corrosion products may adversely affect the course of the condensation reaction. It is thus very desirable to operate the process of the invention using a reaction vessel in which at least the surfaces coming into contact with the reaction mixture are made of a metal which is resistant to corrosion by the reaction mixture. Among the metals, we have found that tantalum is highly resistant to corrosion by the reaction mixture and we thus prefer to operate the process of the invention in a reaction vessel fabricated of or lined with tantalum.

The high resistance to corrosion of tantalum compared with a stainless steel is shown by the following corrosion rates expressed in mm./year. These rates were obtained by immersing rectangular pieces (5 x 2 x 0.2 cm.) of the metal in a mixture of pyridine and zinc chloride in a molar ratio of 2:1 contained in a glass-lined autoclave and maintained at 300° C. and measuring the loss in weight after immersion for 48 hours.

Metal:                                                              Corrosion rate
18/8 Ti _____ 1.2
Tantalum _____ <.01

Example 1

40 gm. of a complex compound of mercuric chloride and pyridine ($HgCl_2 \cdot 2C_5H_5N$) were heated in a Carius tube at 320° C. for 6 hours. The reaction product was washed out of the tube with water, made alkaline with caustic soda and steam distilled. The 2:2'-dipyridyl content of the aqueous distillate was found to be 3.2 gm. determined absorptiometrically as the ferrous 2:2'-dipyridyl complex. The total base present in the aqueous distillate was found to be equivalent to 9.8 gm. pyridine by titration with acid. From these determinations the pass yield of 2:2'-dipyridyl was calculated to be 21.8% and the true yield 65%.

Example 2

Pyridine and either zinc chloride (experiments 1 and 2) or cadmium chloride (experiment 3) in a molar ratio pyridine:chloride of 2:1 were heated for 6 hours in a glass-lined autoclave initially filled with nitrogen at 35 ats. pressure. The reaction product was made alkaline with caustic soda and steam distilled. The aqueous distillate was then acidified, concentrated by evaporation, made alkaline and extracted with ether. 2:2'-dipyridyl and unchanged pyridine were recovered from the ether extract by fractional distillation.

In experiments 1 and 2 the pyridine and zinc chloride were introduced into the autoclave in the form of the complex compound $ZnCl_2 \cdot 2C_5H_5N$, 162 gm. and 171 gm. respectively being used. In experiment 3, 106 gm. pyridine and 122 gm. cadmium chloride were introduced into the autoclave.

The results of the three experiments are given in the following table:

| Expt. No. | Temp., °C. | Pyridine recovered gm. | 2:2'-dipyridyl | | |
|---|---|---|---|---|---|
| | | | Yield, gm. | Pass yield, percent | True yield, percent |
| 1 | 300 | 73 | 3.1 | 3.4 | 21 |
| 2 | 320 | 71 | 7.0 | 7.6 | 33 |
| 3 | 320 | 92 | 9.5 | 7.8 | 32 |

I claim:
1. A process for the production of condensation products of pyridine which comprises heating pyridine at a temperature of 270 to 340° C. in the presence of a halide selected from the group consisting of the halides of zinc, cadmium and mercury.
2. A process as claimed in claim 1 in which the molar ratio pyridine:halide is within the range 1:2 to 25:1.
3. A process as claimed in claim 1 in which the pressure is that developed autogenously by the reaction mixture at the elevated temperature.
4. A process as claimed in claim 1 in which the heating step is carried out in a reaction vessel in which the surface coming into contact with the reaction mixture is made of tantalum.
5. A process for the production of condensation products of pyridine which comprises heating pyridine at a temperature of 270 to 340° C. in the presence of a member of the group consisting of zinc chloride, cadmium chloride and mercury chloride.
6. A process as claimed in claim 5 in which the halide is zinc chloride.
7. A process as claimed in claim 5 in which the halide is cadmium chloride.
8. A process for the production of condensation products of pyridine which comprises heating pyridine at a temperature of 270 to 340° C. in the presence of mercury chloride.

References Cited in the file of this patent

UNITED STATES PATENTS 2,773,066 Linnell et al. ———————— Dec. 4, 1956
2,962,502 Freeman et al. ———————— Nov. 29, 1960

OTHER REFERENCES

Hein et al.: Ber. Deut. Chem., vol. 61B, pp. 1790–1791 (1928).

Klingsberg: "Pyridine and Deriv." (Interscience, Pt. I), p. 55 (1960).